(12) United States Patent
Bae et al.

(10) Patent No.: US 6,750,857 B2
(45) Date of Patent: Jun. 15, 2004

(54) DATA SET-UP SYSTEM FOR DISPLAY DEVICE AND CONTROL METHOD THEREOF

(75) Inventors: Jong-Hwa Bae, Suwon (KR); Kook-Won Kim, Anyang (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 238 days.

(21) Appl. No.: 09/985,664

(22) Filed: Nov. 5, 2001

(65) Prior Publication Data
US 2002/0167499 A1 Nov. 14, 2002

(30) Foreign Application Priority Data
May 11, 2001 (KR) ........................................ 2001-25908

(51) Int. Cl.[7] ................................................. G09G 5/00
(52) U.S. Cl. ....................................................... 345/211
(58) Field of Search ................................. 345/211, 204

(56) References Cited

U.S. PATENT DOCUMENTS

| 5,031,118 | A | | 7/1991 | Morizot | 364/521 |
|---|---|---|---|---|---|
| 5,325,196 | A | | 6/1994 | Yoshimi et al. | 348/190 |
| 5,602,567 | A | | 2/1997 | Kanno | 345/132 |
| 5,631,698 | A | | 5/1997 | Lee | 348/178 |
| 5,654,738 | A | | 8/1997 | Spurlock | 345/132 |
| 5,887,147 | A | | 3/1999 | Arai et al. | 395/256 |
| 5,963,249 | A | | 10/1999 | Kim | 345/204 |
| 6,037,931 | A | * | 3/2000 | Kim | 345/204 |
| 6,289,416 | B1 | * | 9/2001 | Fukushima et al. | 711/113 |
| 6,297,858 | B1 | * | 10/2001 | Yang | 348/731 |
| 6,412,089 | B1 | * | 6/2002 | Lenny et al. | 714/769 |
| 6,437,761 | B1 | * | 8/2002 | Du et al. | 345/11 |

FOREIGN PATENT DOCUMENTS

| EP | 0665525 | 8/1995 |
|---|---|---|
| JP | 03-038175 | 2/1991 |
| JP | 05-072986 | 3/1993 |
| JP | 05-297843 | 11/1993 |
| JP | 07-261729 | 10/1995 |
| JP | 07-295497 | 11/1995 |
| JP | 10-274975 | 10/1998 |
| KR | 1995-029977 | 11/1995 |
| KR | 1996-003460 | 1/1996 |
| KR | 1998-051552 | 9/1998 |
| WO | WO 01/24534 | 4/2001 |

* cited by examiner

Primary Examiner—Joseph Mancuso
Assistant Examiner—Conrad J. DeWitte
(74) Attorney, Agent, or Firm—Robert E. Bushnell, Esq.

(57) ABSTRACT

A method for controlling a data set-up system in a display device comprises the steps of: maintaining an off-mode when electric power is supplied to the display device in order to store operation mode data in a memory; reading out predetermined identification information indicating a storage state of the operation mode data in the memory in the off-mode; comparing reference identification information, indicating a storage state of the operation mode data stored in a microcomputer in which the display device is normally operated, with the identification information in the off-mode data; and controlling operation of the display device according to a result of the latter comparison. With the above method, and with a data set-up system performing functions corresponding to the above steps, breakdown of a circuit due to damage in operation mode data is prevented.

13 Claims, 3 Drawing Sheets

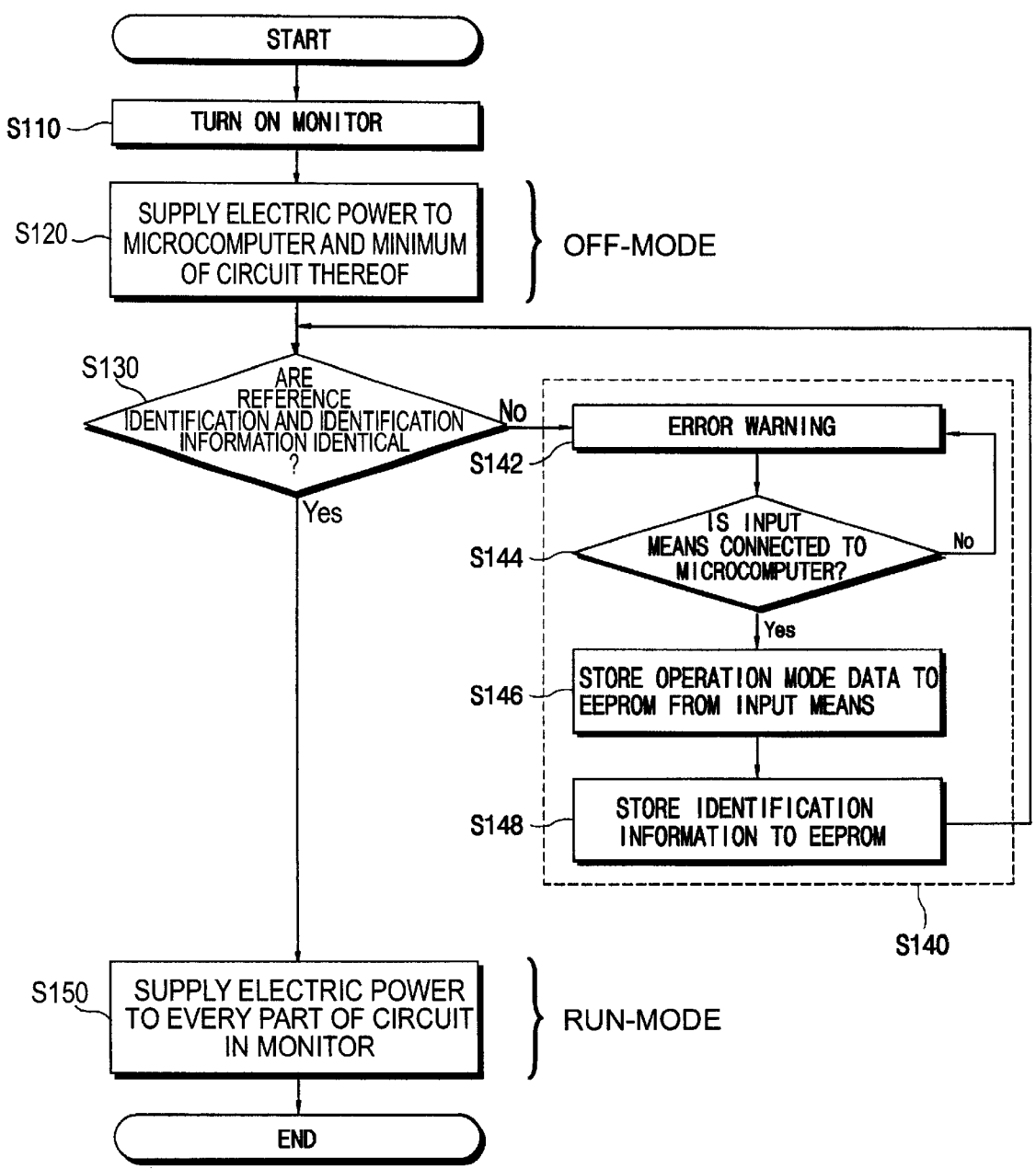

DATA SET-UP SYSTEM FOR DISPLAY DEVICE AND CONTROL METHOD THEREOF

CLAIM OF PRIORITY

This application makes reference to, incorporates the same herein, and claims all benefits accruing under 35 U.S.C. §119 from our application DATA SETTING UP SYSTEM FOR DISPLAYER AND CONTROL METHOD THE SAME filed with the Korean Industrial Property Office on May 11, 2001 and there duly assigned Serial No. 25908/2001.

BACKGROUND OF THE INVENTION

1. Technical Field

The present invention relates, in general, to a data set-up system for a display device and to a method for controlling the same. More particularly, the invention relates to a data set-up system for a display device and to a method for controlling the same, wherein breakdown of main circuits of the display device due to damage of operation mode data is prevented.

2. Related Art

Generally, even if display devices are manufactured in the same models, their screens may be different from one another in quality due to various factors, such as a difference between components thereof, a difference between CRT (cathode ray tube) characteristics, etc. Accordingly, a screen adjustment for each display device is performed at the beginning of the manufacturing process. During the screen adjustment, screen size, whiteness balance, side pincushion, etc. are adjusted according to a video frequency of each display device, and optimal operation mode data taken by means of the screen adjustment are stored in an EEPROM (electrically erasable programmable read-only memory). Thus, if the display device is turned on, it is driven depending upon the operation mode data stored in the EEPROM.

However, when electric power is first supplied to the display device during the manufacturing process, the EEPROM may have no data or undesired data. Further, while a user uses the display device, the operation mode data may be damaged. In these cases, if electric power is supplied to the display device, a control circuit thereof performs an improper operation, thereby breaking down main circuits thereof.

The following are considered generally pertinent to the present invention but are burdened by the disadvantages set forth above: U.S. Pat. No. 5,031,118 to Morizot, entitled APPARATUS AND METHOD FOR ADAPTING MULTIPLE OPERATING MODE MONITOR, issued on Jul. 9, 1991; U.S. Pat. No. 5,325,196 to Yoshimi et al., entitled TELEVISION RECEIVER, issued on Jun. 28, 1994; U.S. Pat. No. 5,654,738 to Spurlock, entitled FILE-BASED VIDEO DISPLAY MODE SETUP, issued on Aug. 5, 1997; Japanese Patent Publication No. 03-038175 to Nakagawa, entitled SCREEN DISPLAY CONTROLLER, published on Feb. 19, 1991; Japanese Patent Publication No. 05-072986 to Tanaka et al., entitled AUTOMATIC ADJUSTING CIRCUIT OF MULTI-MODE TYPE CRT DISPLAY MONITOR, published on Mar. 26, 1993; Japanese Patent Publication No. 05-297843 to Samuels, entitled ADJUSTMENT FOR VIDEO DISPLAY DEVICE AND MENU SYSTEM ON DISPLAY SCREEN, published on Nov. 12, 1993; Japanese Patent Publication No. 07-261729 to Shimono, entitled MONITOR ADJUSTING SYSTEM, published on Oct. 13, 1995; Japanese Patent Publication No. 07-295497 to Kato, entitled DISPLAY METHOD OF MULTI SCAN MONITOR, published on Nov. 10, 1995; Japanese Patent Publication No. 10-274975 to Furumine et al., entitled CRT DISPLAY DEVICE, published on Oct. 13, 1998; Korean Patent Publication No. 1995-29977 to Chi-Yong Lee, entitled FACTORY MODE SETTING APPARATUS AND METHOD, published on Nov. 24, 1995; Korean Patent Publication No. 1996-003460 to Soon-Doo Kim, entitled SELF-DIAGNOSTIC METHOD OF SCREEN CONTROLLING STATUS IN A TV SET, published on Jan. 26, 1996; and Korean Patent Publication No. 1998-051552 to Chun-Suk Lee, entitled MEMORY CORRECTION CONTROLLING METHOD IN A TV SET, published on Sep. 15, 1998.

SUMMARY OF THE INVENTION

Accordingly, the present invention has been developed with the above-described shortcomings and the user's needs in mind, and an object of the present invention is to provide a set-up system for a display device and a method for controlling the same, wherein breakdown of circuits of the display device due to improper operation caused by damage of operation mode data is prevented.

This and other objects of the present invention may be accomplished by the provision of a method for controlling a data set-up system in a display device, comprising the steps of: maintaining an off-mode when electric power is supplied to the display device in order to store operation mode data in a memory; reading out predetermined identification information indicating a storage state of the operation mode data in the memory in the off-mode; comparing reference identification information indicating a storage state of the operation mode data stored in a microcomputer, in which the display device is normally operated, with the identification information in the off-mode data; and controlling an operation of the display device according to the result of the comparison.

Preferably, the method further comprises the steps of supplying electric power to every part of a circuit when the identification information of the memory is identical to the reference identification information of the microcomputer, and converting the off-mode into a run-mode by means of the microcomputer according to the operation mode data in the memory.

Preferably, the method further comprises the steps of maintaining the off-mode while the microcomputer determines that the operation mode data is damaged when the identification information of the memory is not identical to the reference identification information of the microcomputer, and generating a warning indicating an error.

Preferably, the method further comprises the step of renewing the operation mode data and the identification information stored in the memory according to data inputted from an external source when the identification information in the memory is not identical to the reference identification information of the microcomputer.

Preferably, the method further comprises the steps of comparing the reference identification information with the renewal identification information after renewing the operation mode data and the identification information stored in the memory, and controlling the operation of the display device according to the result of that comparison.

The step of comparing the reference identification information with the renewal identification information after renewing the identification information is repeated until respective identification information are identical to each other.

According to another aspect of the present invention, the above and other objects may be also achieved by the provision of a data set-up system for a display device, comprising: a memory storing operation mode data of the display device inputted from an external source and predetermined identification information indicating a storage state thereof; and a microcomputer, having reference identification information indicating the storage state of the operation mode data in which the display device is normally operated, for maintaining the display device in an off-mode when electric power is supplied to the display device in order to store operation mode data, thereby controlling an operation of the display device according to a result of comparing the reference identification information and the identification information in the memory in the off-mode data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein:

FIG. 3 is a control flow chart showing the case wherein the data set-up system for the display device according to the present invention is applied to a usage process of a user.

DETAILED DESCRIPTION OF THE PREFERRED EMBODIMENT

A preferred embodiment of the present invention will now be described in more detail with reference to the accompanying drawings.

Figure 1:
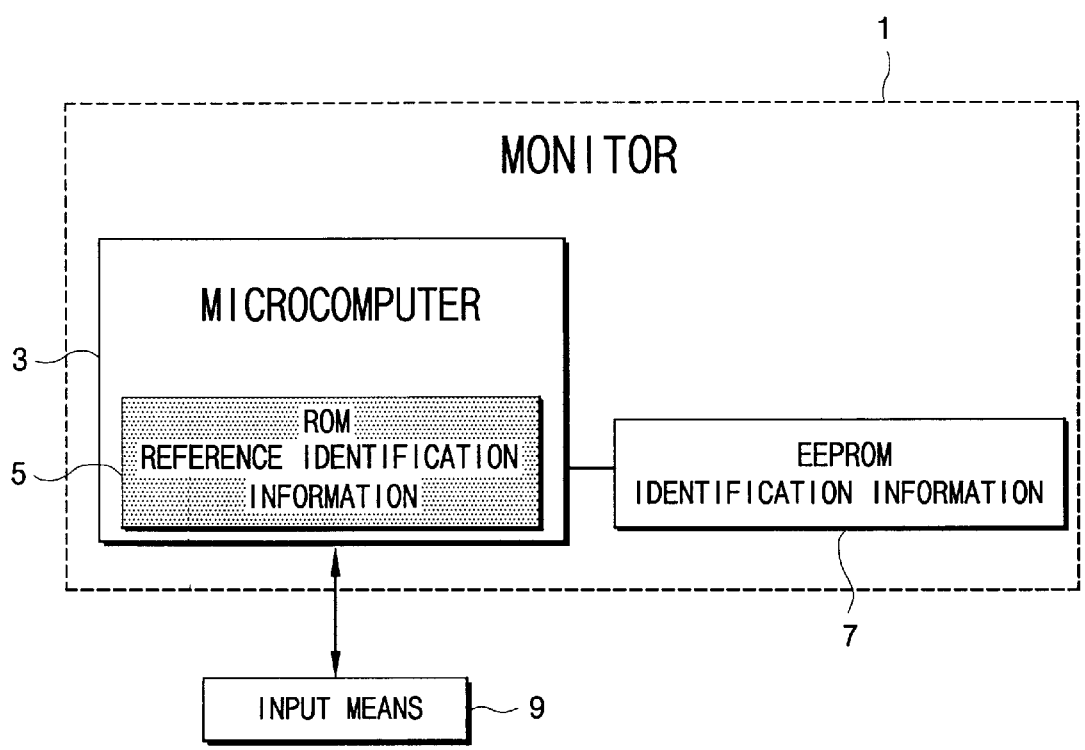
FIG. 1 is a control block diagram of a data set-up system for a display device according to the present invention.

FIG. 1 is a control block diagram of a data set-up system for a display device according to the present invention. Referring to FIG. 1, a data set-up system for a display device according to the present invention comprises a monitor 1, an input means 9 for inputting therethrough operation mode data to drive the monitor 1, a microcomputer 3 controlling the whole operation of the monitor 1, and an EEPROM (electrically erasable programmable read-only memory) 7 storing the operation mode data therein.

The input means 9 includes a jig or the like connected to the microcomputer 3 and directly supplying data to the microcomputer 3. The input means 9, as illustrated by way of example in the present invention, uses a DDC (display data channel) transmission line not only supplying data, but also outputting a signal generated in the microcomputer 3. The microcomputer 3 of the monitor 1 can transmit data through the input means 9, and thus the engineer can determine whether the microcomputer 3 and the monitor 1 are operating normally or not. The operation mode data of the monitor 1, inputted through the input means 9, includes screen set-up data such as data pertaining to screen size, screen position, whiteness balance, side pin-cushion, etc. according to the characteristics of the monitor 1.

The EEPROM 7 is a memory from which data may be read and to which data may be written, and stores therein the operation mode data for controlling the monitor 1. The microcomputer 3 controls operation of the monitor 1 according to the operation mode data stored in the EEPROM 7.

A ROM (read-only memory) 5 serves as an internal memory of the microcomputer 3 which may be read only, and stores therein basic data for operation of the microcomputer 3.

The microcomputer 3 stores the operation mode data and predetermined identification information in the EEPROM 7. The operation mode data is inputted from the input means 9, and the identification information is inputted after the operation mode data is stored in the EEPROM 7. The identification information stored in the EEPROM 7 is data indicating a storage state of the operation mode data, and is used to determine whether or not the operation mode data is damaged. The identification information is generally allotted about four bytes in the storage area.

In the ROM 5 of the microcomputer 3, there is stored reference identification information indicating a storage state of the operation mode data for the mode in which the monitor 1 is normally operated.

The microcomputer 3 controls electric power supplied to every part of the circuit. If electric power is supplied to the monitor 1, the microcomputer 3 operates in an off-mode so that electric power is supplied only to the minimum parts of the circuit for driving the microcomputer 3. In the off-mode, the microcomputer 3 determines whether or not the identification information in the EEPROM 7 is identical to the reference identification information in the ROM 5, and allows electric power to be supplied to every part of the circuit when both identification information are the same. Then, the monitor 1 moves to a run-mode in which the microcomputer 3 operates normally.

In the latter regard, the off-mode and the run-mode correspond to an off-mode and a run-mode, respectively, of a DPMS (display power management standard). In the off-mode, all parts except for the minimum parts of the circuit are cut off from electric power. That is, electric power is supplied only to the minimum parts of the circuit for driving the microcomputer 3. Consequently, in the run-mode, all parts are supplied with electric power and operate normally.

If the identification information is not identical to the reference identification information, the microcomputer 3 determines that the operation mode data of the EEPROM 7 is damaged, generates a warning indicating an error, and detects whether the input means 9 are connected thereto. If the input means 9 are connected to the microcomputer 3, the operation mode data inputted from the external source is stored to the EEPROM 7 again. Conversely, if the input means 9 are not connected to the microcomputer 3, an error warning is continuously generated, and the microcomputer 3 maintains the off-mode until the error is removed.

Figure 2:
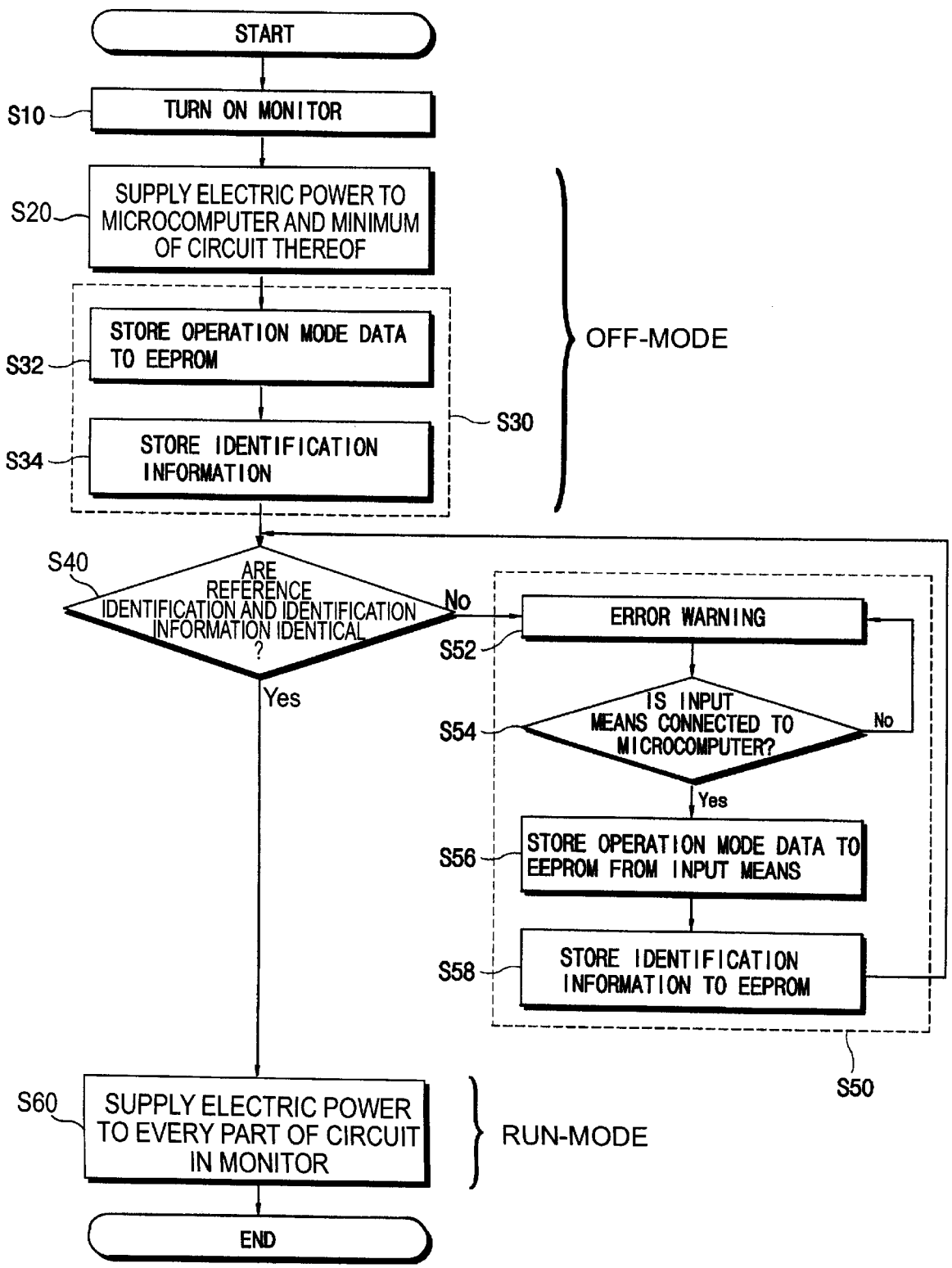
FIG. 2 is a control flow chart showing the case wherein the data set-up system for the display device of FIG. 1 is applied to a manufacturing process.

FIG. 2 is a control flow chart showing the case wherein the data set-up system for the display device of FIG. 1 is applied to a manufacturing process. Referring to FIG. 2, if the monitor 1 is turned on (S10), 5V power is supplied to the microcomputer 3. The microcomputer 3 controls electric power supplied to every part of the circuit, and moves to the off-mode (S20). In the off-mode (S30), the microcomputer 3 stores the operation mode data inputted through the input means 9 in the EEPROM 7 (S32). After the operation mode data is stored, the identification information is inputted through the input means 9, and is stored in the EEPROM 7 (S34).

The microcomputer 3 determines whether or not the reference identification information is identical to the identification information in the EEPROM 7 (S40). The reference identification information indicates the storage state of the operation mode data for normal operation of the monitor 1. If both identification information are the same, the microcomputer 3 supplies electric power to every part of the circuit of the monitor 1, and then the monitor 1 moves to the run-mode wherein the microcomputer 3 operates normally (S60).

In step S40, if the reference identification information is not identical to the identification information, the off-mode is maintained in stet, S50 because it is determined that the operation mode data of the EEPROM 7 is damaged, and steps S52 thru S58 are performed. If the reference identification information is not identical to the identification information, the microcomputer 3 determines that the operation mode data of the EEPROM 7 is damaged and generates a warning indicating an error (S52). In order to indicate the error, an LED (light emitting diode) or a sound may be used.

At the same time, the microcomputer 3 determines whether the input means 9 is connected thereto (S54). If the input means 9 is not connected to the microcomputer 3, the microcomputer 3 maintains the off-mode and generates the error warning continuously (S52). Conversely, if the input means 9 is connected to the microcomputer 3, the microcomputer stores the operation mode data inputted from the external source in the EPPROM 7 (S56), and stores the identification information inputted through the input means 9 in the EEPROM 7 after storing the operation mode data therein, to thereby renew the identification information (S58). After the identification information is stored, the microcomputer 3 moves to step S40 and controls operation of the monitor 1 according to the result of a comparison of the reference identification information and the renewal identification information.

Because FIG. 2 shows an example of the data set-up method for the display device at the beginning of the manufacturing process, in step S10 wherein electric power is supplied, the EEPROM 7 is in a default state so that no data is stored therein. Thus, the empty EEPROM 7 needs to pass through step S30 (S32 and S34) wherein the operation mode data and the identification information are stored therein.

FIG. 3 is a control flow chart showing the case where the data set-up system for the display device according to the present invention is applied to a use process of a user. Referring to FIG. 3, if the monitor 1 is turned on (S110), electric power is supplied to the microcomputer 3. The microcomputer 3 controls electric power supplied to every part of the circuit, and moves to the off-mode (S120). When a user uses the monitor 1, the microcomputer 3 determines if the identification information, which is previously stored in the EEPROM 7, is identical to the reference identification information (S130). If the respective identification information are the same as each other, the microcomputer 3 supplies electric power to every part of the circuit of the monitor 1 and performs the data set-up operation, and the off-mode of the monitor 1 is converted into the run-mode (S150).

On the other hand, if the reference identification information is not identical to the identification information, the microcomputer 3 executes S140 by determining that the EEPROM 7 is in error owing to the damaged data, and generates a warning (S142). It then determines whether or not the input means 9 is connected thereto (S144). If the input means 9 is not connected to the microcomputer 3, the microcomputer 3 maintains the off-mode and continuously generates the error warning (S142). Conversely, if the input means 9 is connected to the microcomputer 3, the microcomputer stores the operation mode data inputted from the external source to the EPPROM 7 (S146), and stores the identification information inputted through the input means 9 to the EEPROM 7 after storing the operation mode data therein (S148). After the identification information and the operation mode data are stored, the microcomputer 3 moves to step S130 and repeats the procedure of controlling operation of the monitor 1 according to the result of a comparison of the reference identification information and the renewal identification information.

The above-described control flow is an example where an end user uses the monitor 1, and if the monitor 1 is in error, step S140 is performed by the manufacturer and data is stored in the EEPROM 7.

With this configuration, the data set-up system for the display device according to the present invention causes the monitor 1 to maintain the off-mode when electric power is supplied thereto, and compares the identification information in the EEPROM 7 with the reference identification information in the ROM 5, thereby converting the off-mode into the run-mode. Accordingly, the circuit is prevented from breaking down by improper operation due to damaged data in the EEPROM 7.

As described above, the present invention provides the data set-up system for the display device and control method thereof, which can prevent improper operation due to damaged operation mode data.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method for controlling data set-up in a display device, comprising the steps of:
   maintaining an off-mode when electric power is supplied to the display device;
   storing operation mode data in a memory during the off-mode maintained when the electric power is supplied to the display device;
   storing identification information indicating a storage state of the operation mode data in the memory in the off-mode;
   comparing reference identification information, indicating a storage state of the operation mode data, with the identification information stored in the memory to produce a comparison result; and
   controlling an operation of the display device according to the comparison result, wherein said display device is normally operated in an operation mode, and said operation mode data is used to control said display device when said display device is operated in the operation mode.

2. The method according to claim 1, further comprising the steps of supplying electric power to every part of a circuit when the identification information stored in the memory is identical to the reference identification information, and converting the off-mode into a run-mode according to the operation mode data in the memory.

3. The method according to claim 2, wherein said converting step is performed by a microcomputer in which the operation mode data is stored.

4. The method according to claim 1, further comprising the steps of maintaining the off-mode when the identification information of the memory is not identical to the reference identification information thereby indicating that the operation mode data is damaged, and generating a warning indicating an error.

5. The method according to claim 4, further comprising the step of renewing the operation mode data and the identification information stored in the memory according to data inputted from an external source when the identification information in the memory is not identical to the reference identification information.

6. The method according to claim 5, further comprising the steps of comparing the reference identification information with renewal identification information after renewing the operation mode data and the identification information stored in the memory to produce a result of comparison, and controlling the operation of the display device according to the result of comparison.

7. The method according to claim 6, wherein the step of comparing the reference identification information with the renewal identification information after renewing the identification information is repeated until respective identification information are identical to each other.

8. A data set-up system for a display device, comprising:
a memory storing operation mode data of the display device inputted from an external source, and identification information indicating a storage state of the operation mode data in the memory; and
a microcomputer having reference identification information indicating the storage state of the operation mode data, and maintaining the display device in an off-mode when electric power is supplied to the display device in order to store the operation mode data in the memory, said microcomputer controlling operation of the display device according to a comparison of the reference identification information and the identification information stored in the memory, wherein said display device is normally operated in an operation mode, and said operation mode data is used to control said display device when said display device is operated in the operation mode.

9. The system according to claim 8, wherein the microcomputer supplies electric power to every part of a circuit when the identification information stored in the memory is identical to the reference identification information of the microcomputer, and converts the off-mode into a run-mode according to the operation mode data stored in the memory.

10. The system according to claim 8, wherein the microcomputer maintains the off-mode when the microcomputer determines that the identification information of the memory is not identical to the reference identification information of the microcomputer, thereby indicating that the operation mode data is damaged, and generates a warning indicating an error.

11. The system according to claim 10, wherein the microcomputer renews the operation mode data and the identification information stored in the memory according to data inputted from the external source when the identification information stored in the memory is not identical to the reference identification information of the microcomputer.

12. The system according to claim 11, wherein the microcomputer compares the reference identification information with renewal identification information after renewing the operation mode data and the identification information stored in the memory to produce a comparison result, and controls operation of the display device according to the comparison result.

13. The system according to claim 12, wherein the microcomputer repeats the comparing of the reference identification data with the renewal identification information until respective identification information are identical.

* * * * *